S. HUBBELL, Jr.

Improvement in Thill-Couplings.

No. 126,209.    Patented April 30, 1872.

Witnesses.
D. H. Thomson
Leonard Cassell

Saunders Hubbell Jr.
By atty.
Barton Pickering

UNITED STATES PATENT OFFICE.

SAUNDERS HUBBELL, JR., OF WEST SALEM, OHIO.

IMPROVEMENT IN THILL-COUPLINGS.

Specification forming part of Letters Patent No. 126,209, dated April 30, 1872.

Specification describing an Improved Jack-Clip and Coupling, invented by SAUNDERS HUBBELL, Jr., of West Salem, in the county of Wayne and State of Ohio.

The first part of my invention relates to a device for connecting a shaft-iron to the jack-clip of a wagon, dispensing with the ordinary bolt; and the second part, to a novel form of coupling for shafts, arms, &c.

Figure 1:
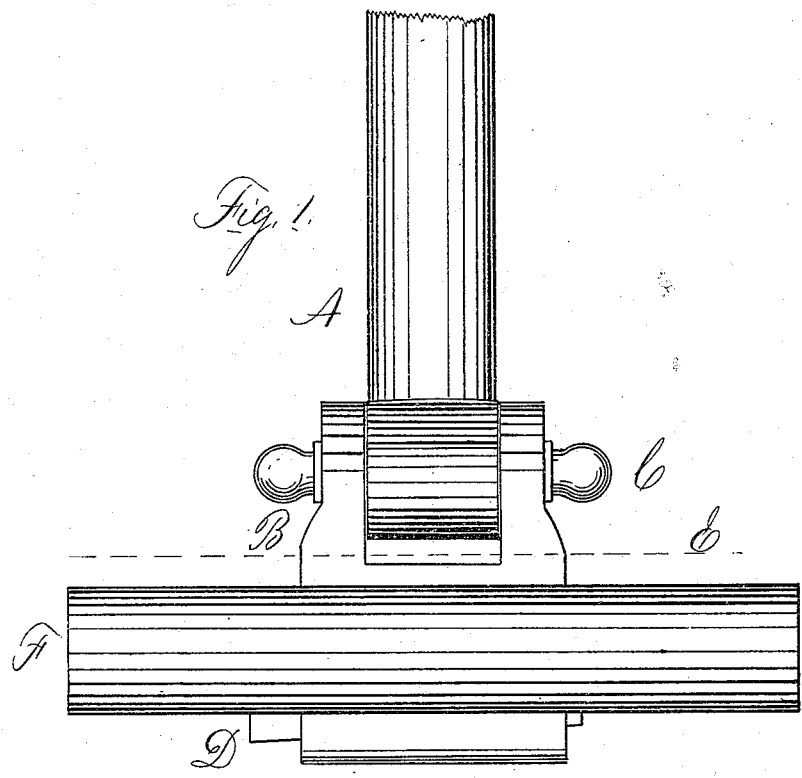
Figure 2:
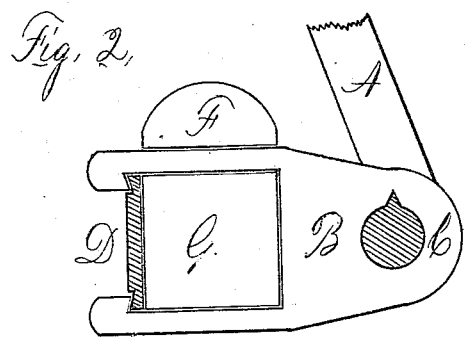

Figure 1 is a top view of the device as connected to an iron axle. Fig. 2 is a cross-section of the same through the right ear of the jack-clip.

F represents the wood, and G the iron of the axle, which is the ordinary form of constructing the iron axle for vehicles. A sufficient portion of the wood is cut away to admit of the passage of the upper portion of the jack-clip B over the iron portion of the axle, the under part passing beneath, and with the wedge D, the iron is fully embraced, and the fastening to the axle made secure. As the wedge is driven the clip is drawn snugly against the axle, and such is the bevel of the straps and wedge, that the straps are inclined to the wedge. For the relation of the several parts embracing the axle see Fig. 2. The shaft-iron A is held between the ears of the jack-clip by the pin C. The eye of this iron has a circular orifice through it, with a triangular slot cut on one side of the orifice. The ends of the pin are rounded; that embraced by the ears is cylindrical, and that embraced by the shaft-iron is of like diameter, and has an angular projection which fills the slot within the eye. At C, Fig. 2, is shown the pin in cross-section, and the orifice in the right ear, as provided for the entrance of the pin. This orifice is identical with that of the shaft-iron. It is necessary, only, that one ear have the slot for the projection on the pin. To enter the pin the slot of the eye and the ear must be in line; and when the position is changed the pin cannot be removed from its position. To make the coupling secure, the pin must be entered while the parts are in an unusual position. (See position of shaft-iron at Fig. 2.)

To adapt this coupling to other uses the ears at the line E are welded onto a shaft or bar, and the eye of the shaft-iron must have welded to it similar parts.

The slot within the jack-clip for the pin may be dispensed with, and an ordinary bolt used. The projection on the pin fills the space between the ears. My purpose is to dispense with bolts and nuts, and effect a more secure attachment.

I claim as my invention—

1. The jack-clip B, with its wedge D, constructed substantially as described, and adapted to either an ordinary bolt or the pin C.

2. The shaft or thill-coupling, composed of the jack-clip B, shaft-iron A, and pin C, and wedge D, constructed substantially as described.

3. The coupling composed of the ears, eye, and pin C, constructed substantially as herein specified.

SAUNDERS HUBBELL, JR.

Witnesses:
JOHN SHELHART,
J. R. HENNEY.